United States Patent Office 3,506,649
Patented Apr. 14, 1970

3,506,649
1 - PHENYLSULFONYL - 2 - HYDROXY - 4 - SUBSTITUTED - PIPERAZINES AND DERIVATIVES THEREOF
Peter H. L. Wei, Upper Darby, and Stanley C. Bell, Penn Valley, Pa., assignors to American Home Products Corporation, New York, N.Y., a corporation of Delaware
No Drawing. Filed Aug. 2, 1967, Ser. No. 657,768
Int. Cl. C07d 51/70
U.S. Cl. 260—239.7          12 Claims

ABSTRACT OF THE DISCLOSURE

The compounds are 1-phenylsulfonyl-2-hydroxy-4-di-substituted-piperazines, and derivatives thereof, having central nervous system activity.

SUMMARY OF THE INVENTION

This invention relates to novel piperazine derivatives having valuable pharmacological activity. More particularly, the invention relates to 1-phenylsulfonyl-2-hydroxy-4-substituted-piperazines and derivatives thereof, having central nervous system activity, and to a method for preparing said new piperazine derivatives.

The new 1 - phenylsulfonyl - 2 - hydroxy-4-substituted-piperazines and derivatives thereof, of the present invention, when considered in their broadest aspect, include those compounds encompassed within the following structural formula:

(I) 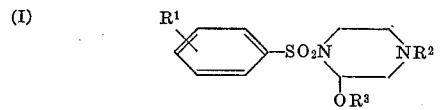

and the non-toxic acid-addition salts thereof with pharmaceutically acceptable acids:

wherein $R^1$ is selected from the group consisting of hydrogen, alkyl, e.g. (lower) alkyl, halo, nitro, amino other than in the ortho position, and acylamino, e.g. (lower) alkanoylamino;

$R^2$ is selected from the group consisting of hydrogen, alkyl, e.g. (lower) alkyl aralkyl, e.g. benzyl and aryl, e.g. phenyl; and $R^3$ is selected from the group consisting of hydrogen, alkyl, acyl, e.g. (lower) alkanoyl, halo (lower) alkanoyl, and aroyl benzoyl.

The novel compounds (I) of the invention may be prepared by a method which comprises: (a) reacting a suitable phenylsulfonyl chloride with 2-bromoethylamine hydrobromide in the presence of triethylamino to form an N-substituted benzenesulfonamide; (b) heating the N-substituted benzenesulfonamide with a 2,2′-dialkoxy ethylamine which may be suitably N-substituted, in the presence of anhydrous potassium carbonate; and (c) heating the resulting dialkoxy ethylamine-substituted benzene sulfonamide in a lower alcohol solution acidified with HCl, to give the corresponding phenylsulfonyl-2-alkoxy-piperazine. Alternatively, in (c), the benzenesulfonamide compound resulting from (b) may be treated with HCl as before, and (c′) then neutralized with sodium bicarbonate to form the corresponding phenylsulfonyl-2-hydroxy-piperazine. The 2-hydroxy-piperazine compound may then be changed to the ester thereof, by (d) warming the 2-hydroxy compound in the presence of a suitable anhydride.

The method described above is illustrated in the following reaction scheme, wherein $R^1$, $R^2$, and $R^3$ have the same meaning set forth above for Formula I with the exception that $R^3$ in each of the formulae below is always other than hydrogen; and $R^4$ is of the group consisting of lower alkyl and phenyl:

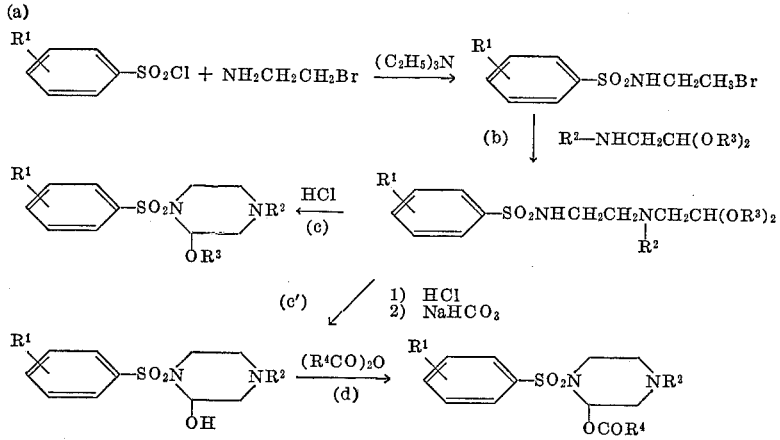

Many of the reactants employed in the above process for preparing the compounds of the invention are compounds which are readily available from commercial sources. Others, which are not commercially available, can be easily prepared in accordance with standard organic procedures well known to those skilled in the art.

It has been disclosed that compounds meeting the required qualifications of Formula I above, whether as free bases or as the aforesaid acid-addition salts thereof, have valuable pharmacological utility in that they effect the central nervous system of warm-blooded animals, acting thereon as suitable depressants and anti-convulsants.

As indicated above, compounds falling within the general Formula I set forth hereinbefore, may be used in the form of their acid-addition salts while still retaining their effectiveness for the stated pharmacological use. The salts may provide greater flexibility in therapeutic use since they may impart various degrees of water-solubility to an otherwise substantially insoluble base. With regard to the acid-addition salts, either organic or inorganic acids may be used for preparing them as long as said acids do not substantially increase the toxicity of the compound. Among the pharmaceutically-acceptable acid-addition salts considered useful for the purposes indicated are, for example, hydrochlorides, sulphates, phosphates, hydrobromides, acetates, tartrates, propionates, sulfonates, and the like.

The acid-addition salts of the novel free bases may be prepared by procedures now well known to those skilled in the art. For example, a selected novel free base may generally be dissolved in a suitable solvent and the selected acid may then be added thereto. Since the preparation of acid-addition salts is so well known, it need not be described in any greater detail here.

When the compounds of this invention are employed as central nervous system depressant or anti-convulsant agents; they may be administered alone or in combination with pharmacologically-acceptable carriers, the proportion of which is determined by the solubility and chemical nature of the compound selected for use, the chosen route of administration, and standard pharmaceutical practice. For example, they may be administered orally in the form of tablets, capsules or solutions, which may contain conventional excipients; or they may be injected parenterally, that is intramuscularly, intravenously, or subcutaneously. For parenteral administration, they may be used in the form of sterile solutions containing other solutes, for example, enough saline or glucose to make the solutions isotonic.

The dosage of the present therapeutic agents will vary with the form and mode of administration and the particular compound chosen. It will generally be found that when a composition comprising a compound of the invention is administered orally, a larger quantity of the active agent is required to produce the same effect as a smaller quantity thereof given parenterally. In general, the compounds of this invention are most desirably administered at a concentration level that will generally afford effective results without causing any harmful or deleterious side effects.

The effectiveness of the compounds of the invention as anti-convulsant agents was determined by a pharmacological evaluation wherein the compounds at a number of dose levels were administered orally (or intraperitoneally (i.p.)) to groups of 6 mice (3 males and 3 females). One hour later (or ½ hour later in those instances where the compound under evaluation was administered i.p.) the animals were challenged with metrazol at a dosage of 125 mg./kg. i.p. The incidence of clonic and tonic convulsions and deaths was observed for ½ hour. Protection against convulsions and death was determined by comparison with controls run simultaneously. An $ED_{50}$ against convulsions and/or death was calculated from probit-log dose curves. By such evaluation, it was determined that the compounds of the invention were effective at a dosage of 200 mg./kg. of body weight.

The following examples are given by way of illustration.

EXAMPLE I

N-(2-bromoethyl)-p-bromobenzenesulfonamide

To an aqueous dioxane solutions of p-bromobenzenesulfonyl chloride (38.3 g. or 0.15 m.) and 2-bromoethylamine hydrobromide (37.0 g. or 0.18 m.), triethylamine (40 g. or 0.40 m.) was slowly added. The solution was stirred for two hours. Benzene was added. The two layers were separated. The organic layer was washed with water and dried over anhydrous $MgSO_4$. After the solvent was removed, the residue was treated with cyclohexane and collected. The crude material (32.5 g.) was recrystallized from benzene, M.P. 90–92° C.

Calcd. for $C_8H_9Br_2NO_2S$ (percent): C, 28.00; H, 2.65; Br, 46.60; N, 4.08; S, 9.35. Found (percent): C, 28.27; H, 2.59; Br, 46.00; N, 4.25; S, 9.20.

EXAMPLE II p-Bromo-N-(2-[(2-diethoxyethyl)methylamino]-ethyl)benzenesulfonamide N-(2-bromoethyl)-p-bromobenzenesulfonamide (60 g. or 0.175 m.) and diethyl-N-methylaminoacetaldehyde acetal (26 g. or 0.175 m.) were heated to reflux for 54 hours, in the presence of 27.6 g. (0.20 m.) of anhydrous $K_2CO_3$. The benzene was decanted, washed with water and dried over anhydrous $MgSO_4$. After benzene was removed, there was obtained 68 g. of an oily residue.

EXAMPLE III 1-(p-bromophenylsulfonyl)-2-ethoxy-4-methylpiperazine hydrochloride p-Bromo-N-(2 - [(2 - diethoxyethyl)methylamino]-ethyl)-benzenesulfonamide was dissolved in ethanol and the solution acidified with HCl. After heating on a steam bath for 15 minutes, the solvent was removed at reduced pressure. The residue was first treated with a small amount of ethanol and then recrystallized from the same solvent. M.P. 163–4° C.

Calcd. for $C_{13}H_{19}BrN_2O_3S \cdot HCl$ (percent): C, 39.03; H, 5.04; Br, 20.01; Cl, 8.88; N, 7.02; S, 8.03. Found (percent): C, 39.10; H, 5.02; Br, 19.0; Cl, 8.80; N, 6.92; S, 7.60.

EXAMPLE IV 1-(p-bromophenylsulfonyl)-2-hydroxy-4-methyl-piperazine p-Bromo-N-(2 - [2 - diethoxyethyl)methylamino)-ethyl)-benzenesulfonamide (6.0 g.) was suspended in water and acidified with HCl. The acid solution was heated on a steam bath for two hours. Upon cooling, the acid solution was first washed with benzene, treated with Darco and neutralized with a $NaHCO_3$ solution. The solid, which was separated, was collected, washed with water and dried. (Weight 2.8 g.) The crude material as recrystallized from benzene, M.P. 175–7° C. (decomp.).

Calcd. for $C_{11}H_{15}BrN_2O_3S$ (percent): C, 39.40; H, 4.51; Br, 23.90; N, 8.35; S, 9.57. Found (percent): C, 39.52; H, 4.27; Br, 24.65; N, 8.01; S, 9.40.

EXAMPLE V 1-(p-bromophenylsulfonyl)-2-hydroxy-4-methyl-piperazine, acetate 1-(p-bromophenylsulfonyl)-2-hydroxy - 4 - methyl-piperazine (30 g.) was dissolved in 25 ml. of acetic anhydride and the solution warmed gently on a steam bath for 10 minutes. After the solvent was removed, the residue was dissolved in ether. A small amount of insoluble material was filtered off. The ether solution, upon standing, yielded some white crystalline solid which was collected. (2.9 g.) The crude material was recrystallized from ethanol, M.P. 133–5° C.

Calc'd for $C_{13}H_{17}BrN_2O_4S$ (percent): C, 41.35; H, 4.54; Br, 21.22; N, 7.43; S, 8.52. Found: C, 41.61; H, 4.57; Br, 21.20; N, 7.68; S, 8.35.

EXAMPLE VI 1-phenylsulfonyl-2-ethoxy-piperazine hydrochloride

N - (2 - [2 - diethoxyethyl)amino]-ethyl)-benzenesulfonamide is prepared by condensing N-(2-bromoethyl) benzenesulfonamide and diethyl amino acetaldehyde acetal in the presence of anhydrous $K_2CO_3$, and is subsequently cyclized in an alcoholic hydrochloric acid to give the titled product

EXAMPLE VII 1-(p-nitrophenylsulfonyl)-2-ethoxy-4-phenyl-piperazine p - Nitro - N - (2[2 - diethoxyethyl)phenylamino]-ethyl)benzenesulfonamide is prepared by condensing p-nitro-N-(2-bromoethyl) benzenesulfonamide and diethyl analinoacetaldehyde acetal in the presence of anhydrous $K_2CO_3$ and is subsequently cyclized in an alcoholic hydrochloric acid solution.

EXAMPLE VIII 1-(p-aminophenylsulfonyl)-2-ethoxy-4-phenylpiperazine

The nitro compound obtained in accordance with Example VII is reduced with hydrogen in ethanol in the presence of $PtO_2$ to give the titled amino compound.

EXAMPLE IX 1-(p-acetamidophenylsulfonyl)-4-benzyl-2-ethoxy-piperazine p - Acetamido - N - (2[2 - diethoxyethyl)benzylamino]- ethyl)benzenesulfonamide is prepared by condensing p - acetamido - N - (2 - bromoethyl)benzenesulfonamide and diethyl N-benzylaminoacetaldehyde acetal in the presence of anhydrous $K_2CO_3$, and is subsequently cyclized in an alcoholic hydrochloric acid solution to give the titled compound.

EXAMPLE X
1-(p-bromophenylsulfonyl)-2-hydroxy-4-methyl-piperazine, chloracetate By reacting the chloroacetic anhydride and 1-(p-bromophenyl-sulfonyl)-2-hydroxy-4-methylpiperazine, the titled compound is obtained.

EXAMPLE XI
1-(p-bromophenylsulfonyl)-2-hydroxy-4-methyl-piperazine, benzoate By reacting benzoyl chloride and 1-(p-bromophenyl-sulfonyl)-2-hydroxy-4-methylpiperazine in the presence of an acid scavenger such as triethylamine, the titled compound is obtained.

EXAMPLE XII
1-(m-chlorophenylsulfonyl)-2-methoxy-4-ethylpiperazine, hydrochloride Following the procedure of Example I, m-chlorobenzenesulfonyl-chloride is reacted with 2-bromoethylamine hydrobromide to obtain N-(2-bromoethyl)-m-chlorobenzenesulfonamide, which is then heated in the presence of 1 - ethylamino - 2 - dimethoxy - ethane in accordance with the procedure of Example III to obtain m-chloro-N-(2-[(2 - dimethoxyethyl)ethylamino] - ethyl) - benzenesulfonamide. The latter product is dissolved in methanol and the solution acidified with HCl, in the manner described in Example III, to result in the desired product, 1-(m-chlorophenylsulfonyl) - 2 - methoxy-4-ethylpiperazine hydrochloride.

EXAMPLE XIII
1-(p-acetamidophenylsulfonyl)-2-ethoxy-4-methyl-piperazine, hydrochloride Following the general sequential procedure of Example XII, p-acetamidobenzenesulfonyl chloride is reacted with 2-bromoethylamine hydrobromide to obtain N-(2-bromoethyl)-p-acetamidobenzenesulfonamide. The latter compound is refluxed in the presence of diethyl-N-methyl-aminoacetaldehyde acetal, to give p-acetamido-N-(2-[(2-diethoxyethyl) - m - methylamino] - ethyl)benzenesulfonamide, which is thereafter dissolved in ethanol and the resulting solution acidified with HCl to obtain the titled product.

EXAMPLE XIV
1-(o-methylphenylsulfonyl)-2-benzoyloxy-4-methyl piperazine

The compound, o-methylbenzenesulfonyl chloride, is reacted with 2-bromoethylamine hydrobromide in accordance with the procedure of Example I to obtain N-(2-bromoethyl)-o-methylbenzenesulfonamide. Following the procedure of Example II, the last named compound is refluxed in the presence of diethyl N-methylaminoacetaldehyde acetal to give o-methyl-N-(2-[2-diethoxyethyl)-methylamino] - ethyl) - benzenesulfonamide, which is then, in accordance with Example IV, acidified with HCl and then neutralized by addition of sodium bicarbonate to give 1 - (o-methylphenylsulfonyl)2-hydroxy-4-methyl-piperazine. The latter compound is then reacted with benzoic acid anhydride to obtain the titled product.

We claim:
1. A compound selected from the group consisting of piperazines of the formula:

(I) 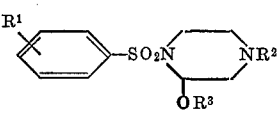

and pharmaceutically acceptable acid-addition salts thereof; wherein $R^1$ is selected from the group consisting of hydrogen, lower alkyl, halo, nitro, amino other than in the ortho position, and lower alkanoylamino; $R^2$ is selected from the group consisting of hydrogen, lower alkyl, phenyl, and benzyl; $R^3$ is selected from the group consisting of hydrogen, lower alkyl, lower alkanoyl, halo(lower) alkanoyl and benzoyl.

2. A compound of the group defined in claim 1, which is:
  1 - (p - bromophenylsulfonyl) - 2 - hydroxy-4-methyl-piperazine.

3. A compound of the group defined in claim 1, which is:
  1 - (p - bromophenylsulfonyl) - 2 - ethoxy - 4 - methyl-piperazine hydrochloride.

4. A compound of the group defined in claim 1, which is:
  1 - (p - bromophenylsulfonyl) - 2 - hydroxy-4-methyl-piperazine, acetate.

5. A compound of the group defined in claim 1, which is:
  1-phenylsulfonyl-2-ethoxy-piperazine, hydrochloride.

6. A compound of the group defined in claim 1, which is:
  1 - (p - nitrophenylsulfonyl) - 2 - ethoxy - 4 - phenyl-piperazine.

7. A compound of the group defined in claim 1, which is:
  1 - (p - aminophenylsulfonyl) - 2 - ethoxy - 4 - phenyl-piperazine.

8. A compound of the group defined in claim 1, which is:
  1 - (p - acetamidophenylsulfonyl) - 4 - benzyl-2-ethoxy-piperazine.

9. A compound of the group defined in claim 1, which is:
  1 - (p - bromophenylsulfonyl) - 2 - hydroxy-4-methyl-piperazine, chloroacetate.

10. A compound of the group defined in claim 1, which is:
  1 - (p - bromophenylsulfonyl) - 2 - hydroxy-4-methyl-piperazine, benzoate.

11. The method of preparing a phenylsulfonyl-2-alkoxy-piperazine which comprises:
  heating a dialkoxy ethylamine-substituted benzene sulfonamide of the formula:

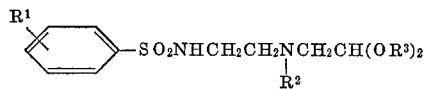

wherein $R^1$ is selected from the group consisting of hydrogen, lower alkyl, halo, nitro, amino other than in the ortho position, and lower alkanoylamino; $R^2$ is selected from the group consisting of hydrogen, lower alkyl, phenyl, and benzyl; $R^3$ is selected from the group consisting of lower alkyl, lower alkanoyl, halo(lower)alkanoyl and benzoyl; in an acidified aqueous solution of a lower alcohol to produce a phenylsulfonyl-2-alkoxy-piperazine of the formula:

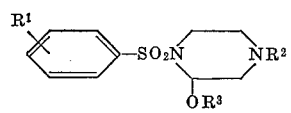

wherein $R^1$, $R^2$ and $R^3$ have the same meaning set forth above.

12. The method of preparing a phenylsulfonyl-2-hydroxy-piperazine which comprises:

heating a dialkoxy ethylamine-substituted benzene sulfonamide of the formula:

wherein $R^1$ is selected from the group consisting of hydrogen, lower alkyl, halo, nitro, amino other than in the ortho position, and lower alkanoylamino; $R^2$ is selected from the group consisting of hydrogen, lower alkyl, phenyl, and benzyl; $R^3$ is selected from the group consisting of lower alkyl, lower alkanoyl, halo(lower)alkanoyl and benzoyl; in an acidified aqueous solution of a lower alcohol; and thereafter neutralizing said solution to produce a phenylsulfonyl-2-hydroxy-piperazine of the formula:

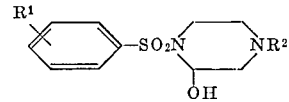

wherein $R^1$, $R^2$, and $R^3$ have the same meaning set forth above.

References Cited

Franz, et al. J.O.C. 31(9): 2847–53 (1966).

HENRY R. JILES, Primary Examiner

C. M. SHURKO, Assistant Examiner

U.S. Cl. X.R.

260—268, 556; 424—229, 250

UNITED STATES PATENT OFFICE
CERTIFICATE OF CORRECTION

Patent No. 3,506,649          Dated April 14, 1970

Inventor(s) Peter H. L. Wei and Stanley C. Bell

It is certified that error appears in the above-identified patent and that said Letters Patent are hereby corrected as shown below:

Column 2, line 48, the word "disclosed" should read -- discovered --.

Signed and sealed this 3rd day of November 1970.

(SEAL)
Attest:

EDWARD M. FLETCHER, JR.          WILLIAM E. SCHUYLER, JR.
Attesting Officer                Commissioner of Patents